US010162858B2

(12) United States Patent
Kerschbaum et al.

(10) Patent No.: US 10,162,858 B2
(45) Date of Patent: Dec. 25, 2018

(54) LOCAL VERSUS REMOTE OPTIMIZATION IN ENCRYPTED QUERY PROCESSING

(71) Applicants: Florian Kerschbaum, Karlsruhe (DE); Patrick Grofig, Karlsruhe (DE); Martin Haerterich, Wiesloch (DE); Mathias Kohler, Stutensee (DE); Andreas Schaad, Karlsruhe (DE); Axel Schroepfer, Rheinstetten (DE); Walter Tighzert, Heidelberg (DE)

(72) Inventors: Florian Kerschbaum, Karlsruhe (DE); Patrick Grofig, Karlsruhe (DE); Martin Haerterich, Wiesloch (DE); Mathias Kohler, Stutensee (DE); Andreas Schaad, Karlsruhe (DE); Axel Schroepfer, Rheinstetten (DE); Walter Tighzert, Heidelberg (DE)

(73) Assignee: SAP SE, Walldorf (DE)

( * ) Notice: Subject to any disclaimer, the term of this patent is extended or adjusted under 35 U.S.C. 154(b) by 280 days.

(21) Appl. No.: 13/955,691

(22) Filed: Jul. 31, 2013

(65) Prior Publication Data
US 2015/0039586 A1 Feb. 5, 2015

(51) Int. Cl.
*G06F 17/30* (2006.01)

(52) U.S. Cl.
CPC ............... *G06F 17/30463* (2013.01)

(58) Field of Classification Search
CPC .................................. G06F 17/30463
USPC ........................................ 707/718
See application file for complete search history.

(56) References Cited

U.S. PATENT DOCUMENTS

| 5,950,188 | A | 9/1999 | Wildermuth |
| 7,729,496 | B2 | 6/2010 | Hacigumus |
| 7,743,069 | B2 | 6/2010 | Chitkara et al. |
| 7,783,900 | B2 | 8/2010 | Hacigumus et al. |
| 7,797,342 | B2 | 9/2010 | Banks et al. |
| 7,974,967 | B2 | 7/2011 | Scheuermann |
| 7,991,763 | B2 | 8/2011 | Bestgen et al. |
| 8,055,678 | B2 | 11/2011 | Kim et al. |
| 8,443,014 | B2 | 5/2013 | Enenkiel |
| 8,458,208 | B2 | 6/2013 | Vyvyan |

(Continued)

OTHER PUBLICATIONS

C.J. Date, "An Introduction to Database Systems," Addison-Wesley Eighth Edition, 2003, 1,041 pages.
R. Agrawal, et al., "Order preserving encryption for numeric data," In Proceedings of the ACM International Conference on Management of Data (SIGMOD), 2004, 12 pages.

(Continued)

*Primary Examiner* — Irete F Ehichioya
*Assistant Examiner* — Johnese T Johnson
(74) *Attorney, Agent, or Firm* — Fish & Richardson P.C.

(57) ABSTRACT

Methods, systems, and computer-readable storage media for optimizing query processing in encrypted databases. In some implementations, actions include receiving a query that is to be used to query an encrypted database, generating a plurality of query plans based on the query, each query plan including a local query and one or more remote queries, the local query being executable at a client-side and the one or more remote queries being executable at a server-side, selecting an optimal query plan from the plurality of query plans, providing one or more remote queries of the optimal query plan to the server-side for execution, receiving one or more remote results, and processing a local query of the optimal query plan and the one or more remote results to provide a final query result.

14 Claims, 4 Drawing Sheets

(56) References Cited

U.S. PATENT DOCUMENTS

| | | | |
|---|---|---|---|
| 2002/0065956 A1* | 5/2002 | Yagawa | G06F 17/30557 |
| | | | 719/330 |
| 2004/0243799 A1* | 12/2004 | Hacigumus et al. | 713/150 |
| 2008/0071785 A1* | 3/2008 | Kabra | G06F 17/30306 |
| 2008/0201293 A1* | 8/2008 | Grosset | G06F 17/30592 |
| 2008/0263006 A1 | 10/2008 | Wolber et al. | |
| 2010/0290623 A1 | 11/2010 | Banks et al. | |
| 2013/0159695 A1 | 6/2013 | Chiueh et al. | |
| 2013/0191650 A1* | 7/2013 | Balakrishnan | G06F 21/6227 |
| | | | 713/190 |
| 2013/0339386 A1 | 12/2013 | Serrano et al. | |
| 2015/0236859 A1* | 8/2015 | Gross | H04L 9/3263 |
| | | | 713/175 |

OTHER PUBLICATIONS

C. Binnig, et al., "Dictionary-based order-preserving string compression for main memory column stores," In Proceedings of the ACM International Conference on Management of Data (SIGMOD), 2009, 13 pages.

A. Boldyreva, et al., "Order-preserving symmetric encryption," In Advances in Cryptology (EUROCRYPT), 2009, 24 pages.

S. Pohlig, and M. Hellman, "An improved algorithm for computing logarithms over GF(p) and its cryptographic significance," IEEE Transactions on Information Theory 24, No. 1, Jan. 1978, pp. 106-110.

R. Popa, et al., "CryptDB: Protecting Confidentiality with Encrypted Query Processing," In Proceedings of the 23rd ACM Symposium on Operating Systems Principles (SOSP), 2011, 16 pages.

* cited by examiner

LOCAL VERSUS REMOTE OPTIMIZATION IN ENCRYPTED QUERY PROCESSING

BACKGROUND

Database systems have been proposed to process queries on encrypted data. Some such database systems employ the principle of not changing the database query processing operators, and instead, adapt the encryption method. Consequently, for many query types, e.g., range queries, such database systems rely on order-preserving encryption.

Next to the functionality of the query processing, security and performance of database systems are of equal importance. Accordingly, the security of order-preserving encryption is of concern. In some examples, order-preserving encryption schemes are provided that are as secure as possible. However, how secure such order-preserving encryption schemes are against crypto attacks, e.g. known plaintext attacks, remains unclear.

SUMMARY

Implementations of the present disclosure include computer-implemented methods for optimizing query processing in encrypted databases. In some implementations, actions include receiving a query that is to be used to query an encrypted database, generating a plurality of query plans based on the query, each query plan including a local query and one or more remote queries, the local query being executable at a client-side and the one or more remote queries being executable at a server-side, selecting an optimal query plan from the plurality of query plans, providing one or more remote queries of the optimal query plan to the server-side for execution, receiving one or more remote results, and processing a local query of the optimal query plan and the one or more remote results to provide a final query result.

In some implementations, generating a plurality of query plans includes: providing an initial candidate query plan based on the query, and providing one or more additional candidate query plans based on the initial candidate query plan.

In some implementations, generating a plurality of query plans further includes: assigning an encryption level to each operator of the initial candidate query plan, and for each pair of operators in the initial candidate query plan, comparing encryption levels, wherein an order of operators in the pair of operators can be changed in at least one additional candidate query plan based on the comparing.

In some implementations, actions further include determining that an encryption level of a lower operator in the operator pair is lower than an encryption level of a higher operator in the operator pair, and, in response, providing an additional candidate query plan, in which the lower operator is moved above the higher operator.

In some implementations, each encryption level corresponds to a maximum data encryption level possible, such that a respective operator can still execute correctly.

In some implementations, the optimal query plan includes a tree structure.

In some implementations, the local query includes a sub-tree of the optimal query plan and includes a root node of the optimal query plan.

In some implementations, each remote query of the one or more remote queries includes at least one lead node of the optimal query plan.

In some implementations, each remote result of the one or more remote results corresponds to a respective remote query of the one or more remote queries.

In some implementations, selecting an optimal query plan from the plurality of query plans includes providing a plurality of costs, each cost corresponding to a respective query plan of the plurality of query plans, wherein the optimal query plan is selected based on the plurality of costs.

In some implementations, actions further include identifying a cost as a minimum cost of the plurality of costs, wherein a query plan corresponding to the minimum cost is selected as the optimal query plan.

In some implementations, each cost is based on at least one of processor cost and memory cost required to execute operators of a respective query plan.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to query processing protocols that improve the security of encrypted query processing by avoiding the use of order-preserving encryption as much as sensible. In general, implementations of the present disclosure include client-side analysis of a query and construction of a query plan. The query plan includes a local query and a remote query, such that local operations yield a higher security. The remote query is executed on encrypted data.

More particularly, a query is translated into a plan of operators, and the plan of operators is optimized to provide an optimized plan. In some examples, the optimized plan includes the local query, e.g., client-side operations, and the remote query, e.g., server-side operations. For example, the query is transformed into the local query and the remote query, where the local query is executed on the client-side and the remote query is executed on the server-side.

In some implementations, data at the server-side, e.g., encrypted data in a database, is decrypted to a deterministic encryption layer instead of an order-preserving encryption layer. In some examples, deterministic encryption allows processing of equality comparisons, and can be (proxy) re-encrypted, such that it is possible to join tables using columns that are encrypted under different encryption keys. In some examples, order-preserving encryption allows processing of greater-than comparisons. By decrypting data at the server-side to only the deterministic encryption layer, discussed in further detail below, the security of the encrypted database is increased.

In an example context, a client processes queries on encrypted data that is stored in an encrypted database, e.g., a server-side database. In the example context, the client performs tasks such as, for example, encrypting queries and decrypting results. In accordance with implementations of the present disclosure, the local query is executed by the client, which local query performs operations on the client that yield an advantage in encryption without substantially sacrificing performance.

Figure 1:
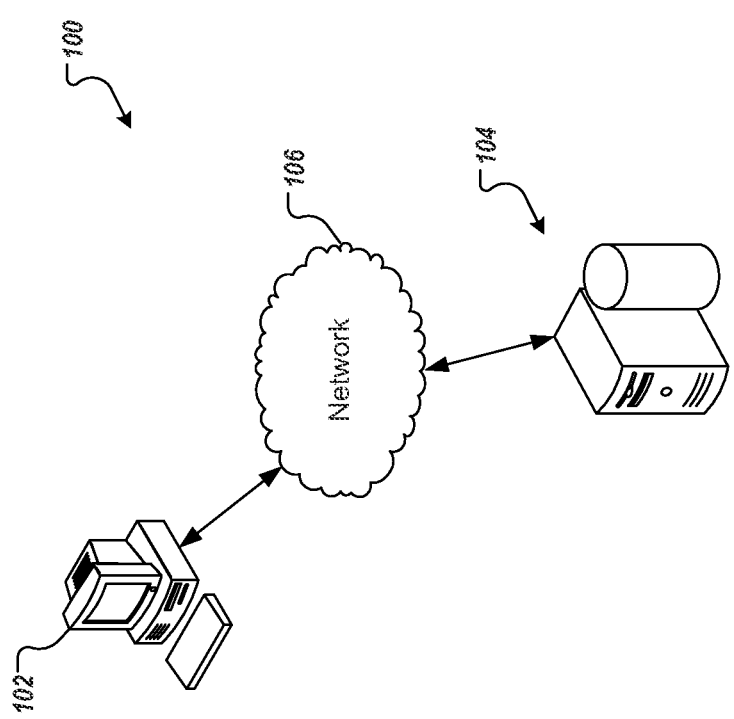
FIG. 1 depicts an example high-level architecture in accordance with implementations of the present disclosure.

FIG. 1 depicts an example architecture 100 in accordance with implementations of the present disclosure. The example architecture 100 provides the example context, within which implementations of the present disclosure can be realized. It is appreciated that implementations of the present disclosure can be realized in other contexts.

The example architecture 100 includes a computing device 102, e.g., client-side, a server system 104 and a network 106. In some examples, the computing device 102 and the server system 104 communicate over the network 106. In accordance with implementations of the present disclosure, the server system 104 can maintain a database that stores encrypted data, e.g., an encrypted database. In some examples, the data is encrypted at the computing device 102, and the encrypted data is sent to the server system 104 over the network 106 for storage. In some examples, the encrypted data is stored in columns, where each column includes a respective encryption key. For example, and as discussed in further detail herein, the encrypted data can be stored in multiple columns, e.g., columns a, b, c, d, e, f each column including an associated encryption key, e.g., $k_a$, $k_b$, $k_c$, $k_d$, $k_e$, $k_f$ stored at the computing device 102.

In some implementations, queries (operations) to the database are performed over the encrypted data. For example, the computing device 102 can submit a query to the server system 104. In accordance with implementations of the present disclosure, and as discussed in further detail herein, the computing device 102 translates the query into a plan of operators, and the plan of operators is optimized to provide an optimized plan. In some examples, a plurality of plans of operators are provided, and each plan is associated with a respective cost. In some examples, the plan of operators associated with the lowest cost is provided as the optimized plan. In some examples, the optimized plan includes a local query, e.g., including operations performed at the client-side, and a remote query, e.g., including operations performed at the server-side. For example, the local query is executed by the computing device 102, and the remote query is executed by the server system 104.

In general, a design goal of encrypted databases in the database-as-a-service context is to move the encryption layer above the query processing layer. For example, in all query process operators, e.g., select, join, are supposed to work on encrypted data. In this manner, it can be ensured that almost any query can be processed on the encrypted data. In some encrypted databases, special operators are provided for many queries, where post-processing and filtering of queries are required. In some encrypted databases, this was improved, such that database operators remain unchanged, and the existing, commercial database systems could be used for encryption in cloud platforms. Even in view of this improvement, special encryption schemes, e.g., order-preserving encryption, deterministic encryption, can be implemented. Such encryption schemes, however, are not as secure as might be desired. Consequently, and in some examples, only database columns that are necessary for performing queries using such encryption schemes are encrypted. One problem, however, is that it is not always a priori known, which columns will be implicated in future queries. Consequently, the encryption state is to be dynamically adjusted, e.g., on-the-fly, to the queries that are performed.

In some examples, in order to dynamically adjust the encryption to the received queries, so-called onion encryption can be implemented. While it is possible to choose an optimally secure encryption, if all queries are known upfront, i.e., a priori, it is difficult to do so, if any queries are processed on-the-fly. Consequently, and in some examples, each data item can encrypted using onion encryption, and can be dynamically decrypted to the corresponding onion layer in response to received queries. An example, encryption onion can include the following example layers:

L3—Randomized Encryption: provided as IND-CPA secure encryption that allows retrieval using only AES encryption in CBC mode.

L2—Deterministic Encryption: allows processing of equality comparisons, and plaintext always enciphers to the same cipher text.

L1—Order-Preserving Encryption (OPE): allows processing of greater-than comparisons, e.g., using order-preserving symmetric encryption.

L0—Data: the data that is to be encrypted.

In some examples, the layers of the onion represent a strict order, where the lower the layer, the less security is provided, but more operations are supported. For example, the layer L0 is the cleartext data layer, which is the least secure, but the maximum number of operations can be performed. In some examples, each lower layer supports all operations that the next upper layer supports, such that a decryption never needs to be undone.

In some examples, homomorphic encryption schemes can be provided for aggregation queries, and to provide searchable encryption. As noted above, the encryption keys are retained at the client, e.g., the computing device 102. The client encrypts data values, e.g., constants in the query and data items in insert operations, and sends the encrypted data values to the database. The database returns encrypted values, which are decrypted by the client. In some examples, the client can be implemented in a common database connector which receives regular queries, e.g., SQL queries, as input.

In some implementations, discussed in further detail below, the client analyzes each query before executing the query, and determines the necessary encryption layer in the onion encryption in the database. In some examples, before sending the query to the database, the client performs decryption of the column(s), for example, implicated in the query to the determined onion layer. Further, no encryption from a lower to a higher encryption layer is ever performed. In this manner, the level (layer) of encryption in the database is dynamically adjusted to the queries processed. However, once a decryption operation to a certain layer has been performed, security of that data is permanently reduced to that layer.

In some examples, data items can be encrypted at the order-preserving (L1) layer. Nevertheless, this layer is improved by obfuscating the encryption and post-processing some parts of the query at the client, in accordance with implementations of the present disclosure.

Figure 2:
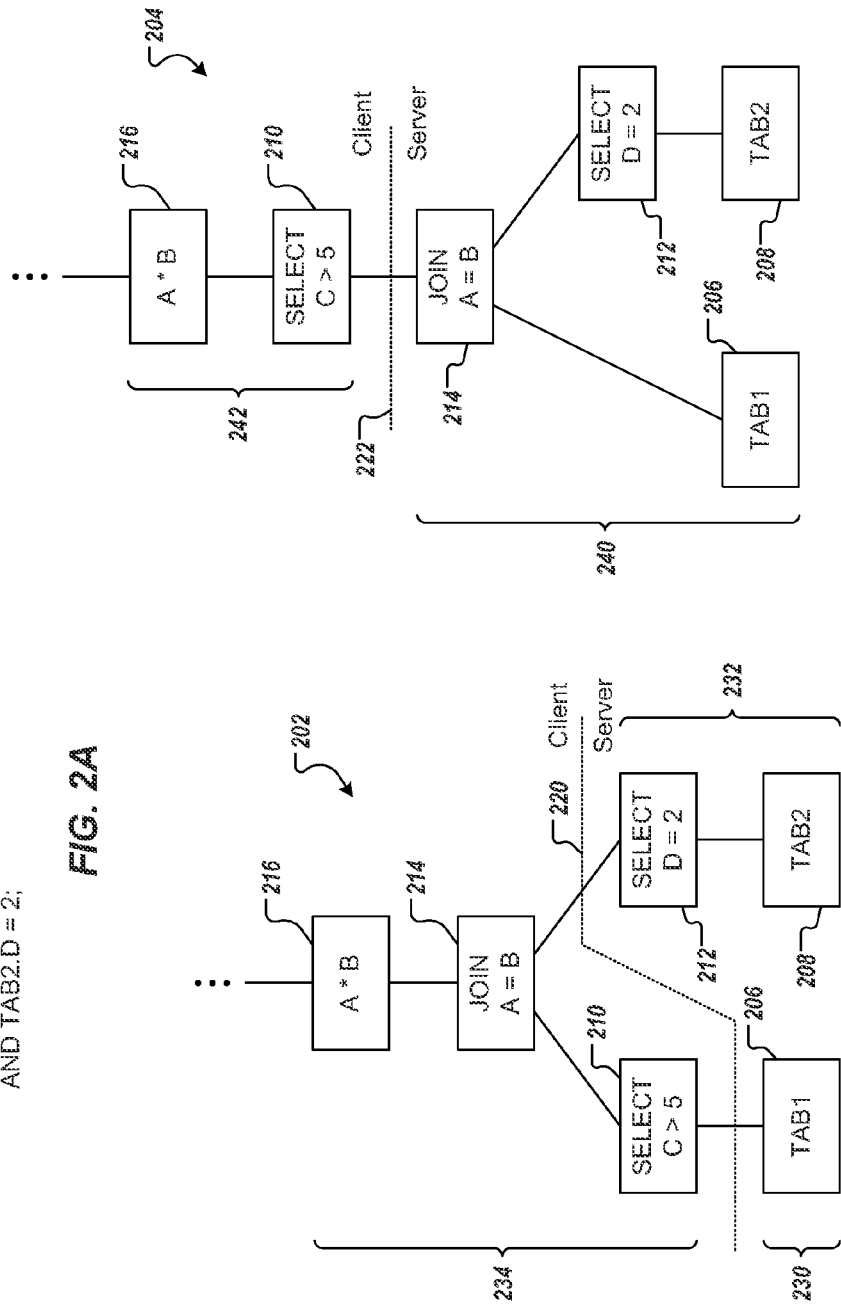
FIG. 2A depicts an example query.
FIGS. 2B and 2C depict respective example query plans based on the example query of FIG. 2A.

Referring now to FIGS. 2A-2C, an example query and query processing will be discussed in detail. FIG. 2A depicts an example query 200, and FIGS. 2B and 2C depict respective example query plans 202, 204 based on the example query 200 of FIG. 2A. The example query plans 202, 204 can be stand-alone query plans, or can be sub-query plans of larger query plans. For example, the query 200 can be a stand-alone query, or can be a portion of a larger query.

In the depicted example, the query plans 202, 204 include operators 206, 208, 210, 212, 214, 216. The operators 206, 208 include table scan operators, e.g., reading values of table 1 (TAB1) and table 2 (TAB2), respectively, the operators 210, 212 include select operators, the operator 214 includes a join operator, and the operator 216 includes an aggregate operator.

In accordance with implementations of the present disclosure, and in view of the examples of FIGS. 2A-2C, a query is translated into a plurality of plans of operators, and a plan of operators is selected as an optimized plan. The optimized plan is divided into a local query and a remote query, such that local operations may yield a security advantage (without sacrificing security). The remote query is provided to the server-side for execution, and results are provided back to the client-side. The local query is executed based on the received results to provide a final result.

With particular references to query planning, the query, e.g., SQL query, is translated into one or more plans of operators. In some examples, such as those depicted in FIGS. 2A-2C, a plan of operators can be provided as a tree, where nodes of the tree are the operators and edges represent a control flow, e.g., results of a child operator are provided as input to a parent operator. For example, each operator reads input rows either from a data source, e.g., a table, or from its child nodes, and produces output rows that are returned to a parent node. In some examples, executing the query amounts to calling the root node iterator. In some examples, for read scenarios, data is "pulled" from the tables, such that the data flow is opposite to the direction of the edges. In some examples, the leaves of the tree are scanning operators on the tables or indices as stored in the database, e.g., operators 206, 208 of FIGS. 2B and 2C. In between the scanning operators, index access, sorting, joining and aggregation operators can be provided.

In addition to the construction of the query plan, each operator is assigned an encryption level. This operator encryption level corresponds to the maximum data encryption level possible that can still execute the operator correctly. For example, deterministic encryption is sufficient for an aggregation operator that includes a "group by" clause. As another example, order-preserving encryption is necessary for sorting.

With regard to query plan optimization, the necessary encryption level in the database for a query to be executed on the server is determined. In some examples, given a query plan, the encryption level for each table at a leaf can be determined by traversing the plan to the root. The minimum level of (maximal) encryption on this path can be determined to be the necessary encryption level at the server-side.

From the security point of view, this can be improved by distributing the execution of the operators between the server-side and the client-side. In some examples, data should be transported between server-side and the client-side only once. Therefore, if a particular operator is executed on the client-side, then all operators using the result set of the particular operator, must also be executed on the client-side. Consequently, and in some examples, the division into a local query and a remote query can be provided by splitting the query plan into an upper part and a lower part. In some examples, the upper part is a sub-tree that includes the root of the query plan, and is executed as post-processing on the client-side. In some examples, the lower part can be parted into a collection of trees that are executed on the server-side. Consequently, and in some examples, the server-side execution can decompose into a collection of queries (remote queries).

In some examples, it can be noted that the edges of the original query plan that connect operators in the upper part to operators in the lower part correspond exactly to the data transfer between server-side and the client-side. In some examples, such a division is compulsory, because the leaves are stored at the server-side, and the result is output at the client-side.

In some implementations, the necessary encryption level in the database can be determined for each table at a leaf as the minimum level of encryption required by operators on the path to the root level inside the lower part of the division only. Consequently, the following example theorem can be provided:

Theorem 1: A division into local and remote query parts has a security advantage, if for at least one table the minimum encryption level on the path to the root is increased.

Nevertheless, this theorem is not directly used to derive a local-remote division. For example, the initial query plan might not be optimal, and/or trivial divisions could be provided, which are more secure, but their performance is not practical. Accordingly, implementations of the present disclosure provide a generic optimization approach. More specifically, and in some examples, a plurality of query plans can be provided, e.g., using plan transformations, and an optimal query plan can be selected, e.g., using a cost function.

In some implementations, plan transformation can be performed with security improvement in mind. In general, it is not practical to enumerate all possible query plans for all queries. Therefore, and in some examples, candidate query plans can be provided using an iterative approach. In some examples, each pair of consecutive operators in the initial query plan is considered. If the encryption level of the operator that is lower in the tree is less secure, a second query plan is created with the two operators of the pair switched, e.g., parent node becomes the child node and vice-versa. This is continued for all query plans until there are no more pairs of operators to consider.

With particular reference to FIGS. 2B and 2C, the query plan 202 can be provided as an initially enumerated query plan. In some examples, the query plan 202 can undergo plan transformation, as discussed above, to provide the query plan 204 of FIG. 2C. For example, an operator pair can include the operator 210 and the operator 214. It can be determined that the encryption level of the operator 210 is less secure than the encryption level of the operator 214. Consequently, the query plan 204 is created, in which the operator 210 and the operator 214 switch positions within the tree. That is, the operator 210 becomes the parent node of the operator 214. Although the examples of FIGS. 2A-2C provide two query plans, i.e., the query plans 202, 204, it is appreciated that more than two query plans could be provided.

With continued reference to the example query plans 202, 204 of FIGS. 2B and 2C, respectively, respective divisions 220, 222 can be provided. In some examples, and as discussed herein, the respective divisions 220, 222 can be provided based on a minimum encryption level at the server-side. In the example of FIG. 2B, the division 220 provides remote queries 230, 232, and a local query 234. The remote query 230 includes the operator 206, and the remote query 232 includes the operators 208, 212, which are to be executed on the server-side. The local query 234 includes the operators 210, 214, 216, which are to be executed on the client-side based on results from the remote queries 230, 232. In the example of FIG. 2C, the division 222 provides a remote query 240, and a local query 242. The remote query 240 includes the operators 206, 208, 212, 214, which are to be executed on the server-side. The local query 242 includes the operators 210, 216, which are to be executed on the client-side based on results from the remote query 240.

In some examples, it can be noted that there is always a trivial local-remote division that yields a security advantage. If all tables are transmitted in (randomized) encrypted form, and are decrypted at the client (before processing the query), then no decryption needs to be performed at the database. Nevertheless, this division is impractical in terms of performance, because all of the entries in a database table would need to be transmitted for each query. Consequently, and in accordance with implementations of the present disclosure, this and other divisions that yield excessive costs are excluded.

In some implementations, after all query plans have been created, their respective costs are determined. In some examples, the costs are provided in terms of computation and/or storage required to execute the query plans, as discussed in further detail below. In some examples, it is clear that, as long as data that is implicated in the query is encrypted on the server-side, the costs can be provided as estimations.

In some implementations, the costs can be provided as a weighted function of necessary processor time, memory access and (server internal) data transfer time, and/or main memory usage. In some examples, the cost function is recursively computed along the tree over all operators, e.g., starting with the table access. Based on the table input size(s), which can be given or estimated, both processor time and memory consumption estimates can be determined. Further, the output table size, which is used at the next level of operators in the tree, is estimated. In some implementations, a similar cost estimation, e.g., with other weights for the cost function, can be performed for the client-side part of the query. Further, data transfer costs can be estimated based on the size of the (intermediate) query result from the server. In some examples, decryption speed can be taken into account, e.g., if the data is decrypted on client-side for temporary use.

In some implementations, to simplify the model, base costs can be provided. For example, a base cost n can be provided for a table, and a base cost c can be provided for a selection. In some examples, compositions of the base costs can be provided. For example, a join of two tables without a condition can result in costs $2n$. In some examples, the cost of a local-remote division can be provided as the sum of all costs of the results in the remote part. This estimates the network transmission costs.

In some implementations, an optimal plan can be selected from the plurality of operator plans can be selected based on cost and security. In some examples, the plan with the minimal costs, and the least decrease in security (compared to the current decryption state) is selected as the optimal plan. In some examples, minimal cost is a primary factor and the least decrease in security is a secondary factor in selecting the optimal plan.

In some implementations, the optimal query plan is split into its remote query and local query. The remote query is sent to the server-side, is executed, and result(s), e.g., table(s), are provided to the client-side. The local query is executed at the client-side to process the result(s) to provide the overall, or final query result. In some examples, the resulting (intermediate) result sets might be too large. In such cases, it is also an option to implement the data access of the local query as a pull mechanism that reads data from the server in blocks. The final query result is provided to the querying application, e.g., the application from which the query was submitted.

Figure 3:
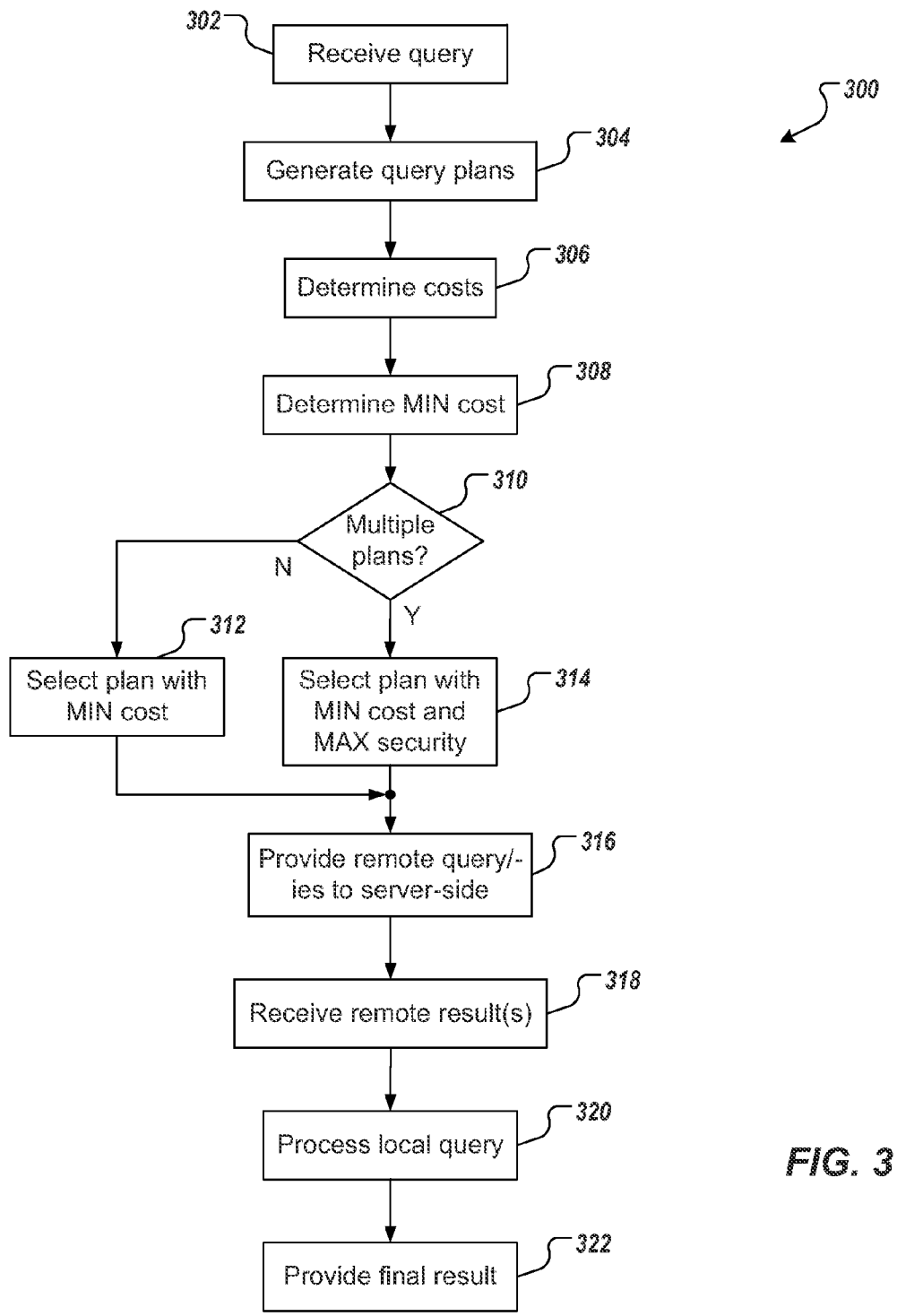
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. In some examples, the example process 300 can be provided on a client-side.

A query is received (302). In some examples, a query is received from a querying application, e.g., an application seeking information from an encrypted database. Query plans are generated (304). In some examples, and as discussed above, a plurality of query plans can be generated. For example, an initial candidate query plan can be provided, and one or more additional candidate query plans can be provided based on the initial candidate query plan. In some examples, the additional candidate query plans can be provided using an iterative approach, where each pair of consecutive operators in the initial candidate query plan is considered, and, if the encryption level of the operator that is lower in the tree is less secure, an additional candidate query plan is created with the two operators of the pair switched, as discussed above.

Costs are determined (306). In some examples, a cost associated with each candidate query plan is determined. In some examples, the costs can be determined based on a weighted function of necessary processor time, memory access and (server internal) data transfer time, and/or main memory usage. In some examples, the costs can be determined based on base costs, e.g., associated with operators. A minimum cost is determined (308). In some examples, a cost of a plurality of costs is determined to be the minimum cost.

It is determined whether multiple query plans include a respective cost that is equal to the minimum cost (310). For example, two or more query plans of the plurality of query plans can be associated with the same cost, the cost having been determined to the minimum cost. If it is determined that there are not multiple plans that include the minimum cost, the query plan associated with the minimum cost is selected as the optimal query plan (312). If it is determined that there are multiple plans that include the minimum cost, the query plan associated with the maximum security is selected as the optimal query plan (314). In some examples, the maximum security is determined as the highest level of security, e.g., of the onion layers discussed above, at the server-side.

One or more remote queries are provided to the server-side (316). In some examples, and as discussed above, the optimal query plan can be partitioned such that one remote query is provided, e.g., FIG. 2C, or multiple remote queries are provided, e.g., FIG. 2B. One or more remote results are received (318). For example, the server-side processes the one or more remote queries to respectively generate the one or more remote results, which are provided to the client-side. The local query is processed (320). For example, the client-side processes the local query based on the one or more remote results. A final result is provided (322). For example, the final result is provided to the querying application.

Figure 4:
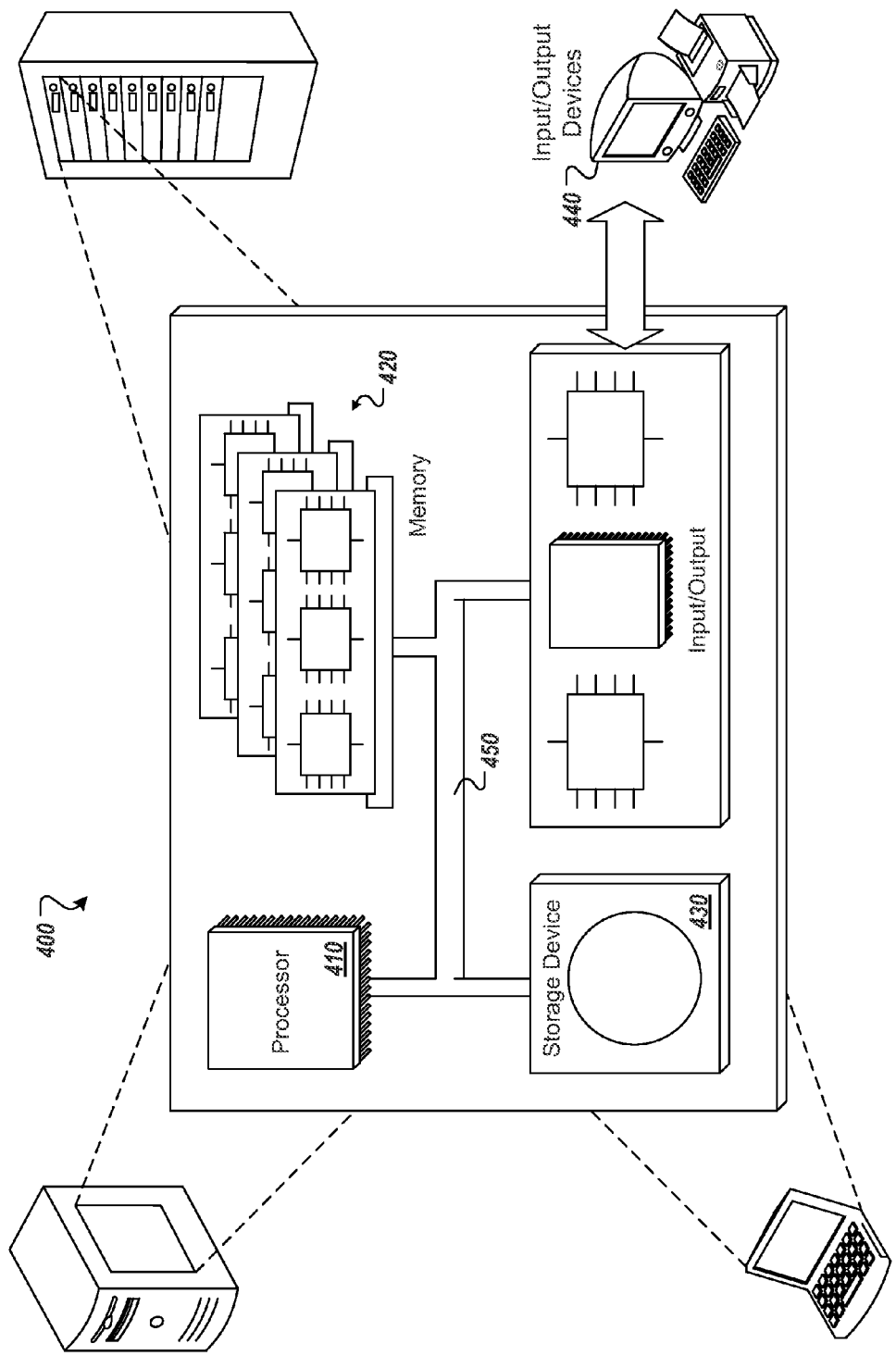
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for optimizing query processing in encrypted databases, the method being executed using one or more processors and comprising:
    receiving a query;
    querying an encrypted database comprising a plurality of items encrypted using a plurality of encryption layers;
    generating, by the one or more processors, a plurality of query plans based on the query, each query plan comprising a local query and one or more remote queries, the local query being executable at a client-side and the one or more remote queries being executable at a server-side;
    selecting, by the one or more processors, an optimal query plan from the plurality of query plans, the optimal query plan comprising at least one of one or more query processing operations and being associated with a maximum security such that the at least one of one or more query processing operations is associated with a minimal decryption;
    providing one or more remote queries of the optimal query plan to the server-side for execution, the execution comprising decrypting at least one of the plurality of items to at least one of the plurality of encryption layers, at which the at least one type of the one or more query processing operations can be performed to generate one or more remote results encrypted at a particular encryption layer of the plurality of encryption layers that is above a local query processing layer, the local query processing layer being included in the plurality of encryption layers;
    receiving, at the client-side, the one or more remote results; and
    processing, at the client-side, a local query of the optimal query plan and the one or more remote results to provide a final query result by decrypting the one or more remote results to the local query processing layer, at which the at least one type of the one or more query processing operations and at least a second type of the one or more query processing operations are performed, the at least a second type of the one or more query processing operations not being executable above the local query processing layer.

2. The method of claim 1, wherein generating a plurality of query plans comprises:
    providing an initial candidate query plan based on the query; and
    providing one or more additional candidate query plans based on the initial candidate query plan.

3. The method of claim 2, wherein generating a plurality of query plans further comprises:
    assigning an encryption level to each operator of the initial candidate query plan; and
    for each pair of operators in the initial candidate query plan, comparing encryption levels, wherein an order of operators in the pair of operators is changed in at least one additional candidate query plan based on the comparing.

4. The method of claim 3, further comprising determining that an encryption level of a lower operator in the operator pair is lower than an encryption level of a higher operator in the operator pair, and, in response, providing an additional candidate query plan, in which the lower operator is moved above the higher operator.

5. The method of claim 3, wherein each encryption level corresponds to a maximum data encryption level possible, such that a respective operator can still execute correctly.

6. The method of claim 1, wherein the optimal query plan comprises a tree structure.

7. The method of claim 6, wherein the local query comprises a sub-tree of the optimal query plan and includes a root node of the optimal query plan.

8. The method of claim 6, wherein each remote query of the one or more remote queries comprises at least one lead node of the optimal query plan.

9. The method of claim 1, wherein each remote result of the one or more remote results corresponds to a respective remote query of the one or more remote queries.

10. The method of claim 1, selecting an optimal query plan from the plurality of query plans comprises providing a plurality of costs, each cost corresponding to a respective query plan of the plurality of query plans, wherein the optimal query plan is selected based on the plurality of costs.

11. The method of claim 10, further comprising identifying a cost as a minimum cost of the plurality of costs, wherein a query plan corresponding to the minimum cost is selected as the optimal query plan.

12. The method of claim 10, wherein each cost is based on at least one of processor cost and memory cost required to execute operators of a respective query plan.

13. A non-transitory computer-readable storage medium coupled to one or more processors and having instructions stored thereon which, when executed by the one or more processors, cause the one or more processors to perform operations for optimizing query processing in encrypted databases, the operations comprising:
    receiving a query;
    querying an encrypted database comprising a plurality of items encrypted using a plurality of encryption layers;
    generating a plurality of query plans based on the query, each query plan comprising a local query and one or more remote queries, the local query being executable at a client-side and the one or more remote queries being executable at a server-side;
    selecting an optimal query plan from the plurality of query plans, the optimal query plan comprising at least one of one or more query processing operations and being associated with a maximum security such that the at least one of one or more query processing operations is associated with a minimal decryption;
    providing one or more remote queries of the optimal query plan to the server-side for execution, the execution comprising decrypting at least one of the plurality of items to at least one of the plurality of encryption layers, at which the at least one type of the one or more query processing operations can be performed to generate one or more remote results encrypted at a particular encryption layer of the plurality of encryption layers that is above a local query processing layer, the local query processing layer being included in the plurality of encryption layers;
    receiving, at the client-side, the one or more remote results; and
    processing, at the client-side, a local query of the optimal query plan and the one or more remote results to provide a final query result by decrypting the one or more remote results to the local query processing layer, at which the at least one type of the one or more query processing operations and at least a second type of the one or more query processing operations are performed, the at least a second type of the one or more query processing operations not being executable above the local query processing layer.

14. A system, comprising:

a computing device; and a computer-readable storage device coupled to the computing device and having instructions stored thereon which, when executed by the computing device, cause the computing device to perform operations for optimizing query processing in encrypted databases, the operations comprising:

receiving a query;

querying an encrypted database comprising a plurality of items encrypted using a plurality of encryption layers;

generating a plurality of query plans based on the query, each query plan comprising a local query and one or more remote queries, the local query being executable at a client-side and the one or more remote queries being executable at a server-side;

selecting an optimal query plan from the plurality of query plans, the optimal query plan comprising at least one of one or more query processing operations and being associated with a maximum security such that the at least one of one or more query processing operations is associated with a minimal decryption;

providing one or more remote queries of the optimal query plan to the server-side for execution, the execution comprising decrypting at least one of the plurality of items to at least one of the plurality of encryption layers, at which the at least one type of the one or more query processing operations can be performed to generate one or more remote results encrypted at a particular encryption layer of the plurality of encryption layers that is above a local query processing layer, the local query processing layer being included in the plurality of encryption layers; receiving, at the client-side, the one or more remote results; and processing, at the client-side, a local query of the optimal query plan and the one or more remote results to provide a final query result by decrypting the one or more remote results to the local query processing layer, at which the at least one type of the one or more query processing operations and at least a second type of the one or more query processing operations are performed, the at least a second type of the one or more query processing operations not being executable above the local query processing layer.

* * * * *